United States Patent
Blankinship et al.

(10) Patent No.: US 9,750,226 B2
(45) Date of Patent: Sep. 5, 2017

(54) PELLETIZED TREE NUT ANIMAL LITTER AND METHOD OF MAKING SAME

(71) Applicant: Eco-Shell, Inc., Corning, CA (US)

(72) Inventors: Michael Blankinship, Red Bluff, CA (US); Raymond L. John, Anderson, CA (US); Helen I. Cantrell, Red Bluff, CA (US)

(73) Assignee: ECO-SHELL, INC., Corning, CA (US)

( * ) Notice: Subject to any disclaimer, the term of this patent is extended or adjusted under 35 U.S.C. 154(b) by 174 days.

(21) Appl. No.: 14/731,572

(22) Filed: Jun. 5, 2015

(65) Prior Publication Data

US 2015/0264886 A1 Sep. 24, 2015

Related U.S. Application Data

(62) Division of application No. 13/029,890, filed on Feb. 17, 2011, now Pat. No. 9,095,118.

(60) Provisional application No. 61/305,203, filed on Feb. 17, 2010.

(51) Int. Cl.
    *A01K 1/015* (2006.01)
(52) U.S. Cl.
    CPC .......... *A01K 1/0154* (2013.01); *A01K 1/0152* (2013.01); *A01K 1/0155* (2013.01)
(58) Field of Classification Search
    CPC .. A01K 1/0152; A01K 1/0154; A01K 1/0155; A01K 1/015
    USPC ......... 119/171, 172, 173; 264/140, 141, 142
    See application file for complete search history.

(56) References Cited

U.S. PATENT DOCUMENTS

| | | | |
|---|---|---|---|
| 3,980,050 A | * | 9/1976 | Neubauer ............ A01K 1/0155 119/171 |
| 4,217,858 A | | 8/1980 | Dantoni |
| 4,311,115 A | | 1/1982 | Litzinger |
| 4,378,756 A | | 4/1983 | Whiteman |
| 4,788,936 A | | 12/1988 | Billings |
| 4,821,677 A | | 4/1989 | Harrison |
| 5,188,064 A | | 2/1993 | House |
| 6,039,004 A | | 3/2000 | Goss et al. |
| 6,098,569 A | | 8/2000 | Kent et al. |
| 6,216,634 B1 | | 4/2001 | Kent et al. |
| 6,405,677 B2 | | 6/2002 | McPherson et al. |
| 6,468,518 B2 | | 10/2002 | Lind et al. |
| 6,622,658 B2 | | 9/2003 | McPherson et al. |

(Continued)

OTHER PUBLICATIONS

Technical Bulletin.*
W.P. Armstrong, "Fruits Called Nuts," Mar. 15, 2009; http://waynesword.palomar.edu/ecoph8.htm.

*Primary Examiner* — Thien Thanh Pham
(74) *Attorney, Agent, or Firm* — DLA Piper LLP (US)

(57) ABSTRACT

A method of making animal litter from a tree nuts, such as from a walnut composition of shells, pelica and membrane, by grinding or crushing the walnut composition, removing all or almost all of the shells from the walnut composition by vibration and aspiration to form muller, adding any desired additives to the muller (e.g. fragrances, fillers and extenders, clumping agent such as guar bean, mold inhibitor agent such as calcium propionate, etc.), and pelletizing the muller by heating and compressing the muller through small apertures and cutting the muller exiting the apertures at desired lengths. The heating and compression of the muller results in pellets that have odor absorbing characteristics that outperform commercial animal litters.

14 Claims, 2 Drawing Sheets

(56) References Cited

U.S. PATENT DOCUMENTS

| | | |
|---|---|---|
| 7,124,710 B2 | 10/2006 | Weaver |
| 2011/0174228 A1 | 7/2011 | Liu |
| 2012/0137982 A1 | 6/2012 | Skulan |

* cited by examiner

PELLETIZED TREE NUT ANIMAL LITTER AND METHOD OF MAKING SAME

RELATED APPLICATIONS

This application is a divisional of U.S. application Ser. No. 13/029,890, filed Feb. 17, 2011, which claims the benefit of U.S. Provisional Application No. 61/305,203, filed Feb. 17, 2010, which are both incorporated herein by reference.

FIELD OF THE INVENTION

The present invention relates to animal litter, and more particularly to an animal litter made of pelletized organic materials from tree nuts.

BACKGROUND OF THE INVENTION

An ideal animal litter is one that is highly absorbent, controls odor, and does not break down to the point that the animal tracks the litter outside of its container. Various solutions have been proposed and marketed. Clumping agents have been included in litter material, so that the soiled portions of the litter clump together to control odor and facilitate removal of just the soiled portions of the litter. However, clumping agents alone do not sufficiently control odor for most applications. Odor control is generally addressed by adding inorganic or organic acids, chemicals, buffering agents, fragrances and/or other mixtures and compositions to the litter to mask the odor and/or produce an odor masking smell when the litter is soiled. Some of these additives are activated by the animal waste itself, while others are activated by agitation of the litter by the animal. Odor control can also be addressed by sprays and other additives that are applied to the litter after it is soiled.

The drawback to most of these litters is that the additives used are expensive to make or obtain, generate hazardous waste byproducts during manufacture, and/or fail to break down properly when disposed in landfills.

It is known that pelletized walnut shell byproducts can be used for wood burning applications. In large scale processing of walnuts, cracking plants typically remove the meat of the walnuts from their shells. The shell byproduct left behind comprises the outer shell itself, the pelica (thin layer between the shell and the meat) and the membrane (thin layer between sections of the meat). Traditionally, the shell byproduct is burned or otherwise disposed of in landfills. However, the shell byproduct has also been combined with saw dust, pelletized by mixing with water and compressing the resulting slurry through a small holes in a die, and marketed as a wood burning product. There was no suggestion however that the pellet composition could be altered to provide odor control as an animal litter.

There is a need for an absorbent organic litter that sufficiently controls odor without reliance on expensive inorganic chemical additives.

BRIEF SUMMARY OF THE INVENTION

Animal litter that includes walnut membrane, walnut pelica, and a mold inhibitor agent. The animal litter contains no walnut shells. The animal litter is in the form of discrete pellets.

Animal litter that includes walnut membrane, walnut pelica, and a mold inhibitor agent. The animal litter contains no walnut shells. The animal litter is in the form of crushed or ground discrete pellets.

Other objects and features of the present invention will become apparent by a review of the specification, claims and appended figure.

DETAILED DESCRIPTION OF THE INVENTION

Figure 1:
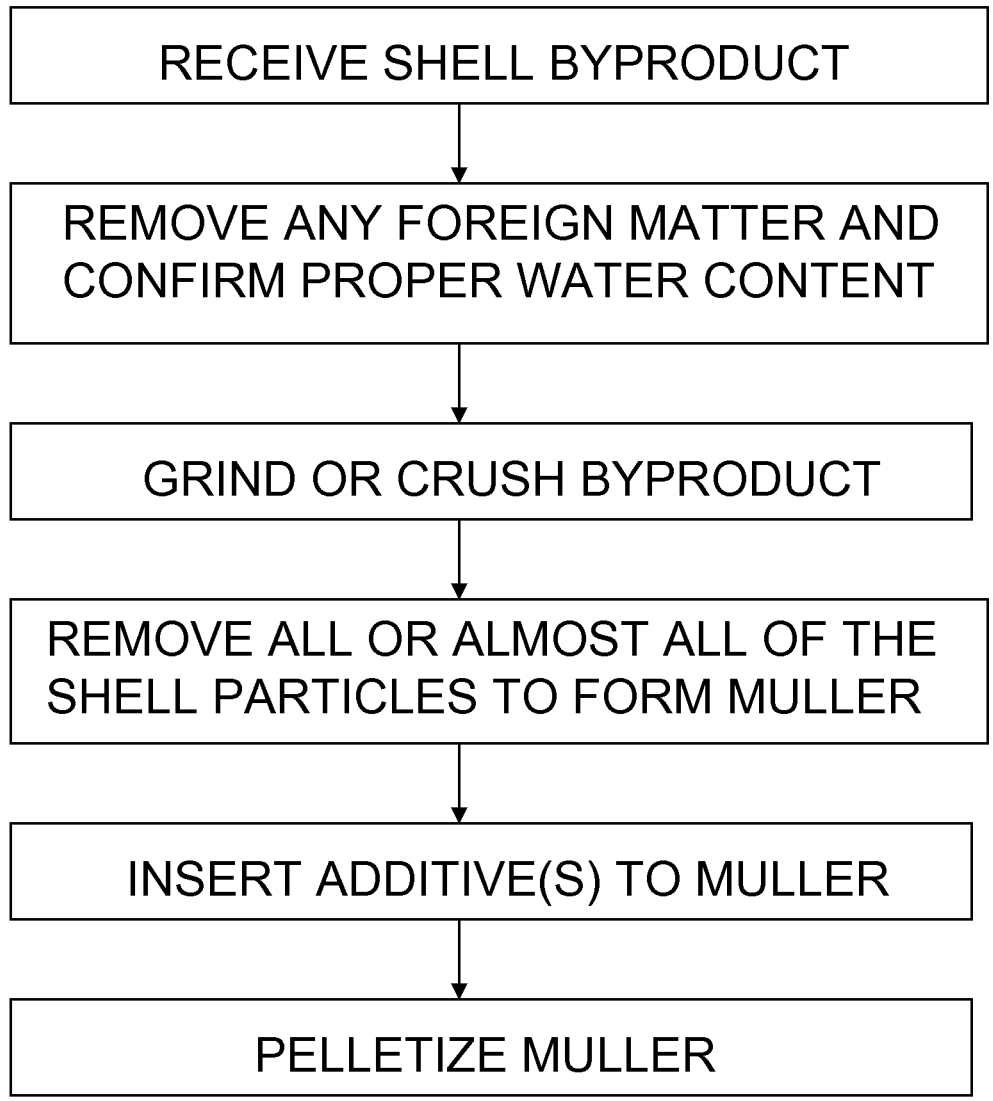
FIG. 1 is a flow diagram illustrating the processing of the pelica and membrane portions of walnuts into pelletized animal litter of the present invention.

The present invention is an organic animal litter that provides superior odor control properties. It has been discovered that the pelica and the membrane portions of walnuts and other tree nuts, when pelletized, provide a material that is highly absorbent and neutralizes odor, and is ideal for use as animal waste litter. Moreover, the pelica and membrane portions of walnuts are a waste byproduct of the walnut industry, so this is an ideal source materials for animal litter that would otherwise need to be burned or discarded as waste.

In large scale processing of walnuts, cracking plants typically remove the meat of the walnuts from their shells. The shell byproduct left behind comprises the outer shell itself, the pelica (thin layer between the shell and the meat) and the membrane (thin layer between sections of the meat). Traditionally, the shell byproduct is burned or otherwise disposed of in landfills. However, it has been discovered that properly processing and pelletizing this byproduct after removing all or almost all of the shell component produces a material that absorbs animal waste, does not break down during use, and surprisingly and naturally masks odor better than most chemical based animal litters.

The preferred method of preparing and pelletizing the walnut pelica and membrane byproduct is as follows:

Step 1: Receive walnut shell byproduct after the meat has been removed (e.g. from walnut cracking plants). Cracking plants that process walnuts for the meat end up producing shell byproduct that is a combination of the walnut's outer shell, pelica and membrane.

Step 2: Inspect the shell byproduct and remove any foreign materials if any from the shells, pelica and membrane. It is also preferable to inspect the shell byproduct to ensure the moisture content is around 10% or less (i.e. utilizing a moisture meter calibrated for walnut shells). It is preferable to avoid a higher moisture content because excessive moisture will prevent proper pelletizing. If the moisture content is determined to be too high, then the material may have to be dried before proceeding by, for example, heating. If the source of the shell byproduct reliably provides shell byproduct with little or no foreign materials and with a sufficiently low moisture content, then this step can be skipped.

Step 3: Grind or crush the shell byproduct so that its larger components are of a semi-uniform size (preferably half an inch or less). One preferable grinding apparatus is a hammer mill. The ground material components will be shell particles (relatively large and/or heavy) and pelica/membrane particles (relatively small and/or light). This step can be skipped if the shell byproduct particles are already sufficiently small.

Step 4: Remove all or almost all of the shell particles from shell byproduct. This removal involves extracting or separating the smaller and/or lighter membrane and pelica particles from the larger and/or heavier shell particles. One technique that can be used to perform this separation step involves a vibrating table and aspiration. The ground or crushed material is passed over a vibrating table at a determined speed, which tends to free and separate the various particles from each other, and repeatedly suspend the particles in the air just above the table, where the smaller and/or lighter pelica/membrane particles are swept away via aspiration, leaving the larger and/or heavier shell particles behind. In practice, it can be impractical to remove all of the bits of shell as some shell particles tend to be aspirated along with the pelica/membrane particles. Therefore, this step is preferably repeated several times to extract the membrane and pelica particles with as little of the shell particles as reasonably practical (i.e. any remaining shell particles constitute no more than about 30% of the resulting material by volume). The resulting material is referred to as "muller".

Step 5: Insert one or more desired additives to the muller. This step may be optional, depending on the final application and configuration of the animal litter, and can be implemented while the muller is in dry form just after separation, or in wet form by adding water or as part of the pelletizing process described below. For example, fillers or extenders can be added to the muller, so long as the muller component of the slurry/paste is sufficiently high that the resulting pelletized product adequately absorb the animal waste and neutralize the odor without falling apart or dissolving. It has been determined that a muller component of at least about 50% by volume (i.e. the fillers/extenders constitute no more than about half of the final product by volume) adequately neutralizes the animal odor. It is the muller as the active ingredient, in pelletized form, that has been found to be the key to neutralizing pet waste odor. Examples of fillers and extenders that can be mixed with the muller up to about 50% by volume include pelica from other free nuts, rice hull (a byproduct of processing rice), wheat, corn, tea leaves, paper and paper pulp products, wood fiber, saw dust, or any other materials that conglomerate and absorb.

Another additive that has been found to be important is a mold inhibitor agent. It has been discovered that mold can form on a soiled mullet based litter, and the use of a mold inhibitor agent can be very important. Examples of mold inhibitor agents include propionates (e.g. calcium propionate), sorbates, and sodium sulphite, and are sold under trade names such as Tox Guard and Nabitor. Calcium propionate added in an amount of 1% by weight has been determined to work very well in preventing the formation of mold.

Other possible additives include a fragrance (to provide an odor masking smell) and a clumping agent (to make the litter clump when wetted by animal waste for easier removal and separation from unsoiled litter). Exemplary clumping agents include sodium bentonite clay (or other similar clay based substances or additives), guar bean (e.g. 3%-6% by weight), corn, or any other additive that promotes glomeration when wetted.

Step 6: The muller is then pelletized by subjected it to a pelletizing process. The preferred pelletizing process includes subjecting the muller to steam and/or water to create a muller slurry or paste. The muller slurry/paste is then fed into a die with specifically designed holes (e.g. conical in shape) of desired dimensions under pressure and heat (e.g. 40K PSI with a raised temperature of 250-300 degrees F.), whereby the muller slurry/paste is forced through the holes and extruding out as pellets on the other side. The heat can be externally provided by heating elements, or can result just from the compression of the muller. The pellets are cut-off at a length of up to about one half inch, and then fed into a cooler which evaporates off excess moisture added as part of the pelletizing process. The pellets can then be packaged for shipment and sale.

The non-limiting physical properties of resulting pellets that have been successfully reduced to practice are:
Diameter~around three to four sixteenths of an inch
Length~around one half inch
Bulk Density~around 40 lbs/cubic foot
Specific Gravity~around 0.60-0.65
Color~dark brown
Moisture~around 7% or lower
Appearance~shiny coating on outside Testing has shown that the mullet pellets neutralize the odor associated with animal waste better than over-the-counter commercial pet litter. The pellets are also highly absorbent, and are virtually dust free (i.e. there is no fine material, and the pellets keep their shape and do not break down under use where the animal would then track the material around).

Figure 2:
FIG. 2 is a flow diagram illustrating the processing of the pelica and membrane portions of walnuts of FIG. 1 with an additional crushing or grinding step performed on the pelletized animal litter.

It has been discovered that removing all or almost all of the shell component from the muller (i.e. where any residual shell particles make up no more than about 30% of the muller by volume), and pelletizing the muller material, are key steps in making it work as an ideal animal litter. Walnut byproduct still containing its shell component, or powdered or granularized muller processed without pelletizing, is not effective. Moreover, walnut byproduct containing more than about 30% shell by volume does not pelletize properly. It is only when the muller (with all or almost all of the shell component removed) is pelletized that it exhibits its superior animal litter properties. It is believed that the combination of heat and pressure during the pelletizing process changes the chemical composition of the muller, possibly forcing tannins to the exterior of the pellet, that provides the odor control by the resulting pelletized product. In fact, it has also been discovered that crushing the pelletized muller to a consistency of granules, sand or powder also results in a superior animal litter material as well. FIG. 2 illustrates the added step of grinding or crushing the pelletized muller, to produce an effective litter of finer consistency (granules, sand, or powder). Animal litter of this consistency can be greatly enhanced by the use of a clumping agent additive as discussed above.

While muller made from walnuts provides exceptional animal litter qualities, muller made from the pelica of other tree nut shells can also be used. For example, muller made from the pelica of almonds, pistachios, hazel nut and pecan can be used to make the muller alone, with each other, or even in combination with pelica and membrane of walnuts. The same process discussed above for walnuts can be used to process pelica from other tree nuts such as almonds, pistachios, hazel nut and/or pecan.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit the claims. Further, as is apparent from the claims and specification, not all method steps need be performed in the exact order illustrated or claimed, but rather in any order that allows the proper fabrication of pelletized muller.

What is claimed is:

1. Animal litter, comprising:
   walnut membrane;
   walnut pelica; and
   a mold inhibitor agent;
   wherein the animal litter contains no walnut shells, and wherein the animal litter is in the form of discrete pellets.

2. The animal litter of claim 1, wherein the walnut membrane and the walnut pelica together form at least 50 percent of the volume of the animal litter.

3. The animal litter of claim 1, further comprising:
   an additive material which does not exceed 50 percent of the volume of the animal litter.

4. The animal litter of claim 3, wherein the additive material is a fragrance.

5. The animal litter of claim 3, wherein the additive material is a clumping agent.

6. The animal litter of claim 5, wherein the clumping agent is guar bean.

7. The animal litter of claim 3, wherein the additive material is rice hull.

8. Animal litter, comprising:
   walnut membrane;
   walnut pelica; and
   a mold inhibitor agent;
   wherein the animal litter contains no walnut shells, and wherein the animal litter is in the form of crushed or ground discrete pellets.

9. The animal litter of claim 8, wherein the walnut membrane and the walnut pelica together form at least 50 percent of the volume of the animal litter.

10. The animal litter of claim 8, further comprising:
    an additive material which does not exceed 50 percent of the volume of the animal litter.

11. The animal litter of claim 10, wherein the additive material is a fragrance.

12. The animal litter of claim 10, wherein the additive material is a clumping agent.

13. The animal litter of claim 12, wherein the clumping agent is guar bean.

14. The animal litter of claim 10, wherein the additive material is rice hull.

* * * * *